United States Patent Office 3,038,857
Patented June 12, 1962

3,038,857
LUBRICANTS CONTAINING ADDITIVES
Charles L. Thomas, Swarthmore, Pa., assignor to Sun Oil Company, Philadelphia, Pa., a corporation of New Jersey
No Drawing. Filed Nov. 10, 1958, Ser. No. 772,717
2 Claims. (Cl. 252—33)

This invention relates to lubricants containing special additives to provide improved properties for motor lubricant and other uses.

The additives employed according to the invention provide generally superior lubricants from the standpoints of sludge dispersing and corrosion resisting properties, and are also capable of providing a desirable alkaline reserve in the lubricant without the attendant disadvantages of metal-containing alkaline reserve additives.

The additives employed to obtain these results are sulfonic acid salts of certain organic polymers containing basic nitrogen. The sulfonic acids employed to make these derivatives are preferably mahogany, i.e. oil-soluble, petroleum sulfonic acids, though sulfonic acids produced by sulfonation of synthetic charge stocks can also be employed, and it is to be understood that the latter acids are contemplated in the subsequent description of the invention.

The invention involves the use in lubricating oil of sulfonic acid salts of basic-nitrogen containing vinyl polymers. A basic-nitrogen containing vinyl polymer is one having the typical carbon chain of a vinyl polymer with basic-nitrogen containing, monovalent radicals attached to carbon atoms of the chain. Such polymers may contain for example the structure:

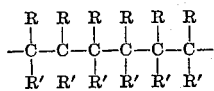

where the various R and R' substituents may be hydrogen, hydrocarbon radicals (—r), aminohydrocarbon radicals (—r'—N<), acyl radicals (—OOC—r), ether radicals (—O—r), amino-substituted ether radicals (—O—r'—N<)

amido radicals (—CON—r)

ester radicals (—COO—r), amino-substituted ester radicals, etc. (—COO—r'—N<), etc., where r is a monovalent hydrocarbon radical and r' is a divalent hydrocarbon radical. Preferably, the polymer contains r or r' radicals having 8 to 20 carbon atoms. Preferably r and r' are aromatic or saturated hydrocarbon radicals such as decyl, lauryl, hexadecyl, and octadecyl radicals, cyclohexyl and alkyl-substituted cyclohexyl radicals, phenyl and alkyl-substituted phenyl radicals, etc.

Homopolymers or copolymers can be employed. Preferably, copolymers of a non-polar monomer such as hexadecyl methacrylate with a basic-nitrogen containing monomer such as diethyl aminoethyl methacrylate are employed. Examples of other suitable non-polar monomers are lauryl methacrylate, vinyl laurate, decyl acrylate, vinyl lauryl ether, dodecyl styrene, etc. Examples of other suitable basic-nitrogen containing monomers are t-octyl aminoethyl methacrylate, vinyl diethylaminoethyl ether, 4-dimethyl aminomethyl styrene, 4-dimethylaminocyclohexyl methacrylamide, dibutylaminoethyl methacrylate, allyl amine, etc. Homopolymers such as N-alkyl polyvinyl amines, N-aryl polyvinyl amines, etc. can be employed.

Preferred polymers for use according to the invention are those disclosed in Willard E. Catlin Patent No. 2,737,-496 of March 6, 1956, and the polymers generally and specifically disclosed therein are suitable for such use. Particularly preferred polymers are those wherein oleophilic radicals having the formula —COOR, where R is an aliphatic hydrocarbon radical containing 8 to 20 carbon atoms, are attached to the principal carbon chain of the polymer through the indicated valence of the carboxyl carbon atom, and wherein amino radicals having the formula —COOR'Nrr', where R' is an aliphatic hydrocarbon radical containing 1 to 6 carbon atoms and r and r' are each hydrogen or lower alkyl radicals (1 to 6 carbon atoms), are also attached to that carbon chain through the indicated valence.

According to one embodiment of the invention, the polyamine mahogany sulfonate has free amino groups, i.e. amino groups which are not neutralized with sulfonic acid, in addition to amino groups which are neutralized with sulfonic acid. In this embodiment, the additives employed are prepared by reacting mahogany sulfonic acids with a greater than stoichiometric amount of a polyamine. Generally, at least 1.2 equivalents of the polyamine are used per equivalent of sulfonic acids. The number of equivalents of polyamine can be determined by multiplying the weight of polyamine used by the number of salt-forming nitrogen atoms in the molecule and dividing by the molecular weight of the polyamine.

When the polyamine mahogany sulfonate contains free amino groups, it has excess alkalinity which is provided in a manner more satisfactory than that in which excess alkalinity is provided in prior art alkaline-reserve sulfonate additives comprising normal or basic metal salts of sulfonic acids. The latter additives have the disadvantage that, in automotive engines for example, the lubricant containing the additive enters the combustion chamber, and the metallic residue becomes incorporated in the combustion chamber deposit and contributes to the octane requirement build-up in the engine.

Preparation of a salt for use according to the invention can be effected by admixing the sulfonic acids and the polymeric amine at room temperature or somewhat higher temperature. The reaction can be performed in the presence or absence of a suitable solvent, and in the presence or absence of the oil in which the product is to be used. Any of the known methods of preparation of salts of sulfonic acids can be employed.

Any suitable oil-soluble alkyl aromatic sulfonic acids can be employed. The preparation of such acids is known in the art, and usually involves sulfonation of a petroleum lubricating oil base stock containing hydrocarbons having 20 to 30 carbon atoms and at least one aromatic ring per molecule, or of a synthetic sulfonation charge comprising an aromatic hydrocarbon to which paraffin wax chains for example have been attached by alkylation. Preferably, the average molecular weight of the sulfonic acids which are obtained is within the range from 350 to 500, though other molecular weights are within the scope of the invention.

The lubricating oil base stock employed in the compositions of the invention may be any suitable stock derived from naphthenic, paraffinic, asphaltic, or mixed base crude. Preferred oils are those having S.U. viscosity at 210° F. within the range from 30 to 100 seconds, but others may be used. The properties of the oil chosen depend of course on the service requirements for the particular use. Instead of mineral lubricating oil base stocks, animal, vegetable, or fish oil lubricants, or synthetic oils prepared by polymerization of olefins or olefin oxides, by the reaction of carbon oxides with hydrogen, or by the hydrogenation of coal, etc., may be employed. Viscous fluids of a lubricating nature generally are suitable.

The amount of polyamine sulfonate employed is preferably within the range from 0.01 to 10 weight percent, more preferably, 0.1 to 5 weight percent, of the compounded oil.

The following example illustrates the invention:

Salts of mahogany sulfonic acids, and of a copolymer of hexadecyl methacrylate and diethyl aminoethyl methacrylate in a ratio of 80:20 are prepared in situ in a solvent-refined Mid-Continent lubricating oil distillate having viscosity of 100 SUS at 100° F., by adding to the oil (1) the copolymer in 1.5% concentration by weight and (2) a 60% concentrate of 450 molecular weight sulfonic acids in 0.5% concentration.

The resulting composition has generally superior sludge dispersing characteristics as compared with prior art detergent additives for motor oils, and is free of ash-forming constituents. Reserve alkalinity is provided by unneutralized amino groups in the copolymer, while sludge dispersing and corrosion inhibiting qualities are provided by sulfonate salt linkages with other amino groups in the copolymer.

Generally similar results are also obtained employing salts of other nitrogen-containing polymers, such as those specifically disclosed previously.

Preferred amino-containing polymers for use according to the invention are those containing at least 12 carbon atoms, and more preferably at least 16 carbon atoms, in each recurring unit of the polymer, in order to provide desirable solubility in petroleum lubricating oil for example. However, lower numbers of carbon atoms in the structural unit are suitable in some instances. The polymers preferably contain at least five nitrogen atoms per molecule; usually, they will not contain more than about 20 nitrogen atoms per molecule, though larger numbers are also suitable.

This application is a continuation-in-part of copending application Serial No. 503,004 of Charles L. Thomas, filed April 21, 1955, and now abandoned.

The invention claimed is:

1. A lubricating composition comprising a major amount of a lubricating oil and a minor proportion, sufficient to improve the sludge dispersing and corrosion resisting properties of the lubricating oil, of salts of oil-soluble alkyl aromatic sulfonic acids and copolymers of alkyl acrylates having 8 to 20 carbon atoms in the alkyl group and aminoalkyl acrylates having up to 18 carbon atoms in the aminoalkyl group, said copolymer containing 5 to 20 nitrogen atoms per molecule, the amount of sulfonic acids relative to the polymer being in the range from one part by weight of sulfonic acids per five parts of said copolymer, to an amount sufficient to neutralize all the amino groups of said copolymer.

2. The lubricating composition according to claim 1 wherein said salts contain free amino groups.

References Cited in the file of this patent
UNITED STATES PATENTS

| | | |
|---|---|---|
| 2,236,168 | Dietrich | Mar. 25, 1941 |
| 2,287,639 | Pings | June 23, 1942 |
| 2,388,962 | Flett | Nov. 13, 1945 |
| 2,533,302 | Watkins | Dec. 12, 1950 |
| 2,582,733 | Zimmer et al. | Jan. 15, 1952 |
| 2,709,163 | Couper et al. | May 24, 1955 |
| 2,717,887 | Saner | Sept. 13, 1955 |
| 2,737,496 | Catlin | Mar. 6, 1956 |
| 2,845,393 | Varvel | July 29, 1958 |